United States Patent Office 2,820,052
Patented Jan. 14, 1958

2,820,052
PRODUCTION OF CHEMICAL COMPOUNDS

Basil Jason Heywood, Dagenham, England, assignor, by mesne assignments, to Parke, Davis & Company, Detroit, Mich., a corporation of Michigan No Drawing. Original application November 16, 1951, Serial No. 256,821. Divided and this application February 23, 1956, Serial No. 569,666

4 Claims. (Cl. 260—466)

This invention is for improvements in or relating to the production of oxazolines and is especially, though not exclusively, concerned with the preparation of the compound threo 2-dichloromethyl-4-hydroxymethyl-5-p-nitrophenyl-$\Delta^2$-oxazoline, the DL and D(-) forms of which possess therapeutic utility but which are primarily useful as intermediates for the preparation of the corresponding forms of threo 2-dichloroacetamido-1-p-nitrophenylpropane 1:3 diol, the D(-) form of which is the antibiotic known as chloramphenicol.

It is known that the threo forms of 2-amino-1-p-nitrophenylpropane 1:3-diols and of corresponding 2-acylamido compounds can be prepared by the hydrolysis of threo 2-substituted-4-hydroxymethyl (or acyloxymethyl)-5-p-nitrophenyl-$\Delta^2$-oxazolines. Convenient starting materials for the preparation of these oxazolines are the corresponding erythro (otherwise known as "allo") forms of 2-acylamido-1-p-nitrophenylpropane 1:3-diols and the process then has involved at one stage or another the step of epimerisation.

As a result of research in connection with the aforesaid process, the present applicants have now discovered that the desired threo oxazolines of the general formula:

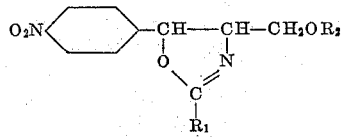

can readily be obtained, uncontaminated to any substantial extent with erythro epimer, if the erythro 2-acylamido-1-p-nitrophenylpropane 1:3-diols are first converted into derivatives of the type:

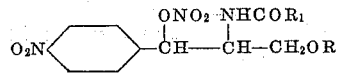

In these formulae R represents an acyl or carboalkoxy group, $COR_1$ represents an aliphatic acyl group containing not more than 4 carbon atoms, preferably acetyl or halogen-substituted acetyl, and $R_2$ represents either a hydrogen atom or the group R.

The process of the present invention consists in reacting the nitric ester of general Formula II with alkali (preferably sodium hydroxide), preferably in the cold or at moderate temperature (i. e. at a temperature not in excess of about 40° C.) and preferably in an organic solvent such as aqueous ethyl alcohol.

When the radical R is a readily hydrolysable group such as acetyl, benzoyl, acid succinyl or carbethoxy, it will be hydrolysed under the conditions of reaction of the nitric ester of Formula II with alkali, in which event the product of the reaction is a 4-hydroxymethyl oxazoline. Where, however, a more stable group R is employed the reaction product is a 4-acyloxymethyl or 4-carboalkoxyoxymethyl oxazoline, the acyl or carboalkoxy group of which is either removed during the subsequent stage of hydrolysis, in known manner, of the oxazoline or subsequent thereto. It is, of course, possible to choose the $COR_1$ and R groups such that the conditions for hydrolysis of the R group will ensure hydrolysis also of the $COR_1$ group and, if such conditions are applied to hydrolysis of the oxazoline or to the resultant product of hydrolysis, the ultimate product is the threo 2-amino-1-p-nitrophenylpropane 1:3-diol instead of the corresponding 2-acylamido compound.

Since an important feature of the present invention is to provide an oxazoline which is directly convertible by hydrolysis into chloramphenicol or the DL-mixture of which it is the D- compound, it is preferred that the radical $R_1$ shall be dichloromethyl and R be a readily hydrolysable group, in which event the reaction may be represented schematically as follows:

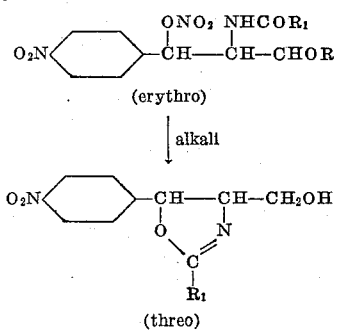

According to a preferred feature of the invention, DL- or L-erythro 2-dichloroacetamino-3-acetoxy-1-p-nitrophenylpropane 1-ol is treated with concentrated nitric acid (s. g. 1.50) and an alcoholic solution or suspension of the resultant nitric ester is treated with a slight excess of sodium or potassium hydroxide solution at room temperature or at a moderate temperature (i. e. a temperature not exceeding about 40° C.) to form DL- or D-threo 2-dichloromethyl - 4 - hydroxymethyl - 5 - p - nitrophenyl - $\Delta^2$-oxazoline.

A particular advantage of the present invention is that the preferred oxazolines, namely DL and D(-) threo 2-dichloromethyl - 4 - hydroxymethyl - 5 - p - nitrophenyl - $\Delta^2$-oxazolines can be obtained directly in a pure state uncontaminated by any of the other isomeric 2-dichloromethyl-4-p-nitrophenyl-hydroxymethyl-$\Delta^2$-oxazolines and as such can be converted (by dissolving in dilute mineral acid followed by neutralisation with a base) into DL- or D-threo 2-dichloroacetamido-1-p-nitrophenylpropane 1:3-diol. The full process can then be regarded as a process for the inversion of erythro 2-dichloroacetamido-1-p-nitrophenylpropane 1:3-diols.

The present invention is illustrated by the following examples:

Example 1

DL-erythro 2-dichloroacetamido-3-acetoxy-1-p-nitrophenylpropane 1-ol (1.0 g.) was added to stirred nitric acid (4.0 cc.; s. g. 1.50), cooled to —60° C. The stirred pale yellow nitric acid solution was allowed to warm spontaneously to 0° C. over about one hour. The solution was then poured into a stirred mixture of water (25 cc.) and ice (25 g.) and the suspension so obtained stirred for 15 minutes. The white solid was filtered off, powdered in a mortar, and washed with water. The yield of crude nitric ester was almost quantitative. Crystallization of the crude product from methanol (15 cc.) gave pure DL-erythro 2-dichloroacetamido-3-acetoxy-1-p-nitrophenylpropane 1-ol nitric ester in pale yellow cubes, M. P. 126–7° C. The yield was 0.80 g. or 71.5% of theory.

The DL-erythro 2-dichloroacetamido-3-acetoxy-1-p-nitrophenylpropane 1-ol was obtained by reacting DL-erythro 2-dichloroacetamido-1-p-nitrophenylpropane 1:3- diol with slightly over the theoretical quantity of acetyl chloride in the presence of pyridine. The product melts at 116–7° C.

The DL-erythro 2-dichloracetamido-3-acetoxy-1-p-nitrophenylpropane 1-ol nitric ester (410 mg.), as prepared above, was suspended in methanol (8 cc.) at 0° C. To the stirred suspension was added slowly 2N sodium hydroxide solution (1 cc.). After three minutes a pale yellow solution was attained and the solution was then gradually heated to 30–40° C. After maintaining at this temperature for 10 minutes, the reaction mixture was cooled to 10° C. and neutralized with 2N acetic acid solution. The product crystallised out, on adding distilled water, as pale yellow plates. Crystallisation of the product from aqueous methanol gave pure DL-threo 2-dichloromethyl-4-hydroxymethyl-5-p-nitrophenyl-$\Delta^2$-oxazoline, M. P. 128–9° C.

If the crude DL-erythro 2-dichloracetamido-3-acetoxy-1-p-nitrophenylpropane 1-ol be converted directly to the oxazoline, the overall yield then is 80% of the theoretical yield.

Example II

L-erythro 2- dichloracetamido-3- acetoxy-1- p- nitrophenylpropane 1-ol (1.35 g.) was added evenly to stirred nitric acid (s. g. 1.50) cooled to about —30° C. The reaction mixture was allowed to warm spontaneously to 0° C. and the clear colourless solution so obtained poured onto a stirred ice-water mixture (20 g.). The white micro-crystalline suspension was stirred for 10 minutes prior to filtering off and water-washing the crude L-erythro 2- dichloracetamido- 3- acetoxy-1-p- nitrophenylpropane 1-ol 1-nitric ester. The yield of this material was 90% of theory (1.35 g.) and the melting point of the material after crystallisation from methanol was 139–40° C.

Crude L-erythro 2-dichloroacetamido-3-acetoxy-1-p-nitrophenylpropane 1-ol (2.0 g.) was suspended in methanol (10 cc.) and then a slight excess of 2N sodium hydroxide added. At first a yellow solution was obtained, but later crystals separated out. After standing at laboratory temperature for three-quarters of an hour and then at 35° C. for 10 minutes, the suspension was cooled to 5° C. prior to filtering off the pale yellow crystals. The D-threo 2-dichloromethyl-4- hydroxymethyl-5-p-nitrophenyl-$\Delta^2$-oxazoline (1.15 g.) was obtained in a 77.5% of theory yield and the product meltde at 133–5° C.

The overall yield for the two stages was 70% of theory.

Example III

DL-erythro 2- dichloracetamido-3- benzoxy-1-p- nitrophenylpropane 1-ol (0.96 g.) was added evenly to stirred nitric acid (s. g. 1.50° at about —30° C. over five minutes. During the course of one hour the pale yellow solution was allowed to warm spontaneously to 0° C. The solution was poured onto a stirred mixture of water (25 cc.) and ice (25 cc.). After stirring for 15 minutes, the white suspension was filtered and the solid washed well with water and dried in a vacuum desiccator. The yield (1.10 g.) was 95% since dinitration had occurred and the product was therefore, DL-erythro 2-dichloracetamido-3-m'-nitrobenzoxy-1-p-nitrophenylpropane 1-ol 1-nitric ester. The melting point of the product after crystallisation from methanol was 138.8 to 141.5° C.

DL-erythro 2-dichloracetamido-3-m'-nitrobenzoxy-1-p-nitrophenylpropane 1-ol 1-nitric ester (0.6 g.) was suspended in stirred methanol (12 cc.) at 0° C. and 2N sodium hydroxide (1.5 cc.) was added to give a pale yellow solution. The reaction mixture was then heated to 30–40° C. and held at this temperature for 10 minutes. The solution was cooled to 10° C. prior to precipitating out the oxazoline by the addition of distilled water. The yield of crystals (0.23 g.) was 64% of theory. The crude DL-threo 2-dichloromethyl-4-hydroxymethyl-5-p-nitrophenyl-$\Delta^2$-oxazoline melted at 127–128.5° C.

Example IV

DL-erthyro 2- dichloracetamido-3- carbethoxyoxy- 1-p-nitrophenylpropane 1-ol (1.98 g.) was converted to the 1-nitric ester in a similar way to that described in the preceding examples. The yield of DL-erythro 2-dichloracetamido-3- carbethoxyoxy-1-p- nitrophenylpropane 1-ol 1-nitric ester was 44% of theory (2.05 g.) and the melting point was 120–123.5° C.

The crude nitric ester obtained above was dissolved in methanol (20 cc.) at 0° C. and 2N sodium hydroxide (5 cc.) added. The solution was maintained at 30–40° C. for 10 minutes and then cooled to 10° C. The product crystallised out on addition of distilled water. The yield of crude DL-threo 2-dichloromethyl-4-hydroxymethyl-5-p-nitrophenyl-$\Delta^2$-oxazoline was 60% of theory and it melted at 123.5–128° C.

Example V

DL- erythro 2- dichloracetamido-3- succinoxy-1-p-nitrophenylpropane 1-ol (2 g.) was converted to the 1-nitric ester in a similar way to that described in the preceding examples. The crude nitric ester, which was not obtained crystalline, was converted directly to the oxazoline by treatment of a methanolic solution at 30–40° C. with 2N sodium hydroxide which was added dropwise at such a rate that the reaction medium was always just alkaline to Clayton Yellow test paper. The reaction mixture was maintained for 10 minutes at 30–40° C. after the last addition of sodium hydroxide and then cooled to 10° C. The oxazoline was isolated in the same way as described in the preceding examples.

Example VI

DL-erythro 2-dichloracetamido-3-acetoxy-1-p-nitrophenylpropane 1-ol nitric ester (410 mg. as prepared in Example I) was suspended in methanol (8.0 cc.) at 0° C. while 2N potassium hydroxide (1.5 cc.) was added gradually. The reaction mixture was allowed to stand for one hour at 0° C. and then heated to 30–40° C. for 10 minutes. The product was isolated by first cooling the reaction mixture to 10° C. and then by adding distilled water. The DL-threo 2-dichloromethyl-4-hydroxymethyl-5-p-nitrophenyl-$\Delta^2$-oxazoline (210 mg., M. P. 127–8° C.) was obtained in a 76% of theory yield.

I claim:

1. Process which comprises mixing a compound of formula

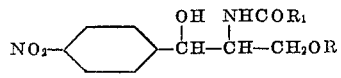

with concentrated nitric acid at a temperature below about 0° C. thereby producing a compound of the formula

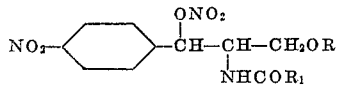

where R is a member of the class consisting of carboxylic acid acyl and carboalkoxy groups and $R_1$ is a member of the class consisting of methyl and halogen substituted methyl groups.

2. A compound having the formula

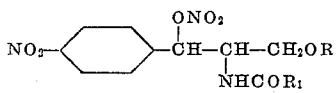

where R is a member of the class consisting of carboxylic acid acyl and carboalkoxy groups and $R_1$ is a member of the class consisting of methyl and halogen substituted methyl groups.

3. Process which comprises mixing an erythro acylamido compound of formula
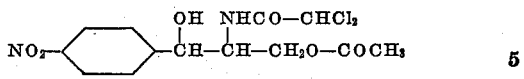
with concentrated nitric acid at a temperature below about 0° C. thereby producing an erythro 1-nitrate compound of formula
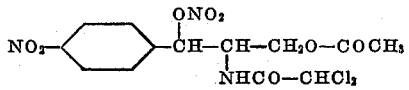
4. A compound having the formula
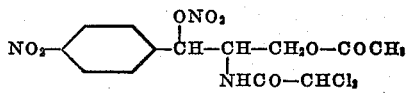
References Cited in the file of this patent
FOREIGN PATENTS
| | | |
|---|---|---|
| 505,352 | Belgium | Sept. 15, 1951 |
| 711,135 | Great Britain | June 23, 1954 |